United States Patent
Furukawa et al.

(10) Patent No.: US 10,451,162 B2
(45) Date of Patent: Oct. 22, 2019

(54) TORQUE TRANSMISSION DEVICE

(71) Applicant: NITTAN VALVE CO., LTD., Kanagawa (JP)

(72) Inventors: Takuya Furukawa, Kanagawa (JP); Michihiro Kameda, Kanagawa (JP)

(73) Assignee: NITTAN VALVE CO., LTD., Kanagawa (JP)

( * ) Notice: Subject to any disclaimer, the term of this patent is extended or adjusted under 35 U.S.C. 154(b) by 0 days.

(21) Appl. No.: 15/560,384

(22) PCT Filed: Sep. 29, 2015

(86) PCT No.: PCT/JP2015/077448
§ 371 (c)(1),
(2) Date: Sep. 21, 2017

(87) PCT Pub. No.: WO2017/056178
PCT Pub. Date: Apr. 6, 2017

(65) Prior Publication Data
US 2018/0066742 A1 Mar. 8, 2018

(51) Int. Cl.
*F16H 48/36* (2012.01)
*F16H 48/24* (2006.01)
*F16H 48/34* (2012.01)
*F16H 59/38* (2006.01)
*F16H 48/20* (2012.01)
(Continued)

(52) U.S. Cl.
CPC ............ *F16H 48/36* (2013.01); *F16H 48/24* (2013.01); *F16H 48/34* (2013.01); *F16H 59/38* (2013.01); *F16H 59/58* (2013.01); *F16H 2048/205* (2013.01); *F16H 2048/364* (2013.01); *F16H 2059/405* (2013.01)

(58) Field of Classification Search
CPC .... F16H 48/10; F16H 48/36; F16H 2048/106; F16H 2048/364
USPC ........................................................ 475/248
See application file for complete search history.

(56) References Cited

U.S. PATENT DOCUMENTS 1,352,269 A     9/1920 Indahl
2,791,919 A *   5/1957 Wildhaber .............. F16H 48/10
                                                     475/248
(Continued)

FOREIGN PATENT DOCUMENTS

EP    0291544 A1   11/1988
FR    579926 A     10/1924
FR    748062 A     6/1933
(Continued)

*Primary Examiner* — Erin D Bishop
(74) *Attorney, Agent, or Firm* — Roberts Mlotkowski Safran Cole & Calderon P.C.

(57) ABSTRACT

The torque transmission device includes side gears having a same axis of rotation coupled to rear wheels, a case disposed around the outer circumferential side of the side gears, and rotating around the axis of the side gears, and a pinion gear rotatably supported by the case and engaged with the side gears in a straddling manner. The side gears are spur gears having a different number of teeth, and the pinion gear is a spur gear driven by a motor and having an axis of rotation that is parallel to the axis of rotation of the side gears. Forming the side gears and pinion gear from spur gears advantageously allows the side gears to be compactly arranged along their axis of rotation.

8 Claims, 4 Drawing Sheets

(51) Int. Cl.
    *F16H 59/40*         (2006.01)
    *F16H 59/58*         (2006.01)

(56) References Cited

U.S. PATENT DOCUMENTS 4,813,297 A *   3/1989   Azuma .................. B60K 17/20
                                                                  180/248
    4,969,532 A *  11/1990   Oyama ................ B60K 17/346
                                                                    180/233

FOREIGN PATENT DOCUMENTS

| | | |
|---|---|---|
| JP | 2006-308055 A | 11/2006 |
| JP | 2010-190287 A | 9/2010 |
| JP | 2012-132478 A | 7/2012 |
| WO | 2010/069729 A1 | 6/2010 |
| WO | 2012/084303 A1 | 6/2012 |

* cited by examiner

TORQUE TRANSMISSION DEVICE

TECHNICAL FIELD

The present invention relates to a torque transmission device transmitting torque to a wheel on one side and a wheel on the other side.

BACKGROUND ART

A vehicle is equipped with a differential device as a torque transmission device for smoothing a running state during turning etc. The differential device is disposed and interposed between left and right wheels, between front and rear wheels, etc., and the differential device generally includes a pair of side gears (bevel gears) arranged facing each other on the same axis and respectively coupled as a torque output member to a wheel on one side and a wheel on the other side of the vehicle, a supporting member disposed on the outer circumferential side of the pair of the side gears and rotating around the axis of the pair of the side gears as a torque input member, and a pinion gear (bevel gear) rotatably supported by the supporting member and engaged with the pair of the side gears in a straddling manner.

This enables absorption (adjustment) of a difference in the rotation number between inside and outside wheels and a difference in the rotation number between front and rear wheel during turning while the vehicle is running, and the turning can be made easier.

If a wheel on one side slips in mud, on a frozen road surface, etc., or a wheel on the inside of a turn lifts up (lift-in occurs) due to a centrifugal force during turning in an accelerated state in a vehicle equipped with the differential device, torque is no longer transmitted to a wheel on the other side on the ground. Therefore, a torque transmission device mounted on a vehicle has a differential device further including a differential limiting mechanism (diff-lock mechanism) as described in Patent Document 1 and, when a wheel on one side slips as described above, the differential limiting mechanism couples one of the side gears (specifically, axles) and the supporting member in the differential device by using a clutch mechanism. As a result, in such a case that a wheel on one side slips, the both side gears making a pair integrally rotate in accordance with rotation of the supporting member, so that a drive force can reliably be transmitted to a road surface through a wheel on the other side.

PRIOR ART DOCUMENT

Patent Document

Patent Document 1: Japanese Laid-Open Patent Publication No. 2012-132478

SUMMARY OF THE INVENTION

Problem to be Solved by the Invention

However, bevel gears are used as a pair of side gears and a pinion gear in the torque transmission device and, to engage the pinion gear with the pair of the side gears in a straddling manner, the side gears making a pair must be separated from each other approximately at a distance slightly shorter than the diameter of the pinion gear.

Moreover, the torque transmission device must has a clutch mechanism configured as a differential limiting mechanism (diff-lock mechanism) on the lateral side of the supporting member in the differential device (on one outer side in a direction of parallel arrangement of the pair of the side gears), and an actuation space of the clutch mechanism (a movement space for coupling and decoupling clutch members that are constituent elements of the clutch mechanism) must be ensured on the lateral side of the supporting member in addition to a disposition space for the constituent elements of the clutch mechanism (see FIG. 1 of Patent Document 1). Therefore, the torque transmission device comparatively significantly extends outward in the direction of parallel arrangement of the pair of the side gears.

The present invention was conceived in view of the situations and it is therefore an object of the present invention to provide a torque transmission device capable of being compactified as much as possible in a direction of parallel arrangement of a pair of side gears while ensuring a differential function and a differential limiting function.

Means for Solving Problem

To achieve the object, the present invention provides
a torque transmission device comprising: a pair of side gears arranged facing each other on the same axis and respectively coupled as a torque output member to a wheel on one side and a wheel on the other side of a vehicle; a supporting member rotating around the axis of the pair of the side gears as a torque input member; and a pinion gear rotatably supported by the supporting member and engaged with the pair of the side gears in a straddling manner, the pair of the side gears being configured as cylindrical gears having teeth disposed on either an outer circumferential surface or an inner circumferential surface, the side gears having the numbers of teeth different from each other, the pinion gear being a cylindrical gear having teeth disposed on an outer circumferential surface, the teeth engaging with the pair of the side gears, the pinion gear being disposed with an axial direction of the pinion gear directed in the same direction as the axial direction of the pair of the side gears, the pinion gear being associated with a rotation drive source applying rotation corresponding to a running state of the vehicle.

With this configuration, since the pinion gear formed as a cylindrical gear is engaged in a straddling manner with the pair of the side gears also formed as cylindrical gears, when the supporting member acting as the torque input member rotates around the axis of the pair of the side gears while the pinion gear does not rotate on its axis (while the pinion gear is not rotationally driven), the pinion gear rotates integrally with the supporting member (revolves around the axis of the pair of the side gears) and the rotation of the pinion gear presses the pair of the side gears, causing the pair of the side gears to substantially integrally rotate (a direct-coupling state (a differential limiting function)). Therefore, even in a situation where a wheel on one side is about to slip, a wheel on the other side can be kept rotating.

Additionally, with regard to torque distribution, the pinion gear and the side gears combined as cylindrical gears do not generate a torque splitting function as in the case of the pinion gear formed as a bevel gear and torque is always distributed to the one side gear and the other side gear in accordance with respective loads thereof, so that the torque can optimally be distributed without a time lag from a sudden change in road surface condition.

Since the pair of the side gears is configured as cylindrical gears different in the number of teeth and the pinion gear formed as a cylindrical gear is engaged with the pair of the side gears such that the pinion gear is associated with the rotation drive source applying rotation corresponding to a running state of the vehicle, the pinion gear can rotationally be driven by the rotation drive source to rotate around the axis of the pinion gear in a rotating state (revolving state) associated with the rotation of the supporting member in a running state of vehicle such as during turning, and the rotation of the pinion gear on its axis and the numbers of teeth of the pair of the side gears different from each other can be utilized to preferably generate a desired difference in the rotation number between the side gears making a pair absorbing a difference in the rotation number during turning etc. (a differential function).

On the other hand, since the pinion gear formed as a cylindrical gear is engaged in a straddling manner with the pair of the side gears formed as cylindrical gears, and the differential function and the differential limiting function (more specifically, a diff-lock function) can be selected depending on the presence/absence of the rotation of the pinion gear on its axis, this configuration eliminates the need for forming the clutch mechanism on the lateral side of the supporting member so as to ensure the differential limiting function.

Additionally, since the differential function and the differential limiting function can selectively be executed depending on whether the pinion gear is allowed to rotate on its axis in the state in which the pinion gear is always engaged with the pair of the side gears, this eliminates the need for a switching operation between engagement and disengagement of the gears.

The following forms can be achieved as preferable constituent forms of the present invention on the premise of the configuration of the present invention.

(1) The torque transmission device can have a configuration in which the pair of the side gears is formed as cylindrical gears having teeth disposed on the outer circumferential surfaces, the supporting member is disposed on the outer circumferential side of the pair of the side gears, and the pinion gear is engaged with the pair of the side gears on the radial outer side of the pair of the side gears.

As a result, a rotation force can easily be transmitted to the pinion gear from the outside and, while the side gears making a pair are arranged extremely close to each other, the pinion gear can be engaged with the pair of the side gears. Consequently, the torque transmission device can significantly be compactified in the direction of parallel arrangement of the pair of the side gears.

(2) The torque transmission device can have a configuration in which the pair of the side gears is formed as cylindrical gears having teeth disposed on the inner circumferential surfaces, the supporting member is disposed on the inner circumferential side of the pair of the side gears, and the pinion gear is engaged with the pair of the side gears on the radial inner side of the pair of the side gears.

As a result, a specific form can be provided that eliminates the need for disposing a clutch mechanism on the lateral side of the supporting member for switching between the differential function and the differential limiting function.

(3) The torque transmission device can have a configuration in which the wheel on one side and the wheel on the other side of the vehicle are made up of left and right wheels, and the torque transmission device comprises a steering-angle sensor detecting a steering angle and a control device controlling the rotation drive source during turning based on steering-angle information detected by the steering-angle sensor such that the rotation number of one of the side gears coupled to the wheel on the outside of the turn is made larger as compared to the rotation number of the other side gear and made larger as the steering angle detected by the steering-angle sensor becomes larger from a neutral position.

As a result, during turning of the vehicle, a difference in the rotation number between the left and right wheels can accurately and specifically be adjusted to ensure easiness of turning.

(4) On the premise of (3), the torque transmission device can have a configuration in which when making the rotation number of one of the side gears coupled to the wheel on the outside of the turn larger as compared to the rotation number of the other side gear, the control device controls the rotation drive source to rotate in either direction of forward rotation and reverse rotation.

As a result, the direction of the rotation of the pinion gear on its axis can be changed depending on a turning direction of the vehicle to make the rotation number of one of the side gears coupled to the wheel on the outside of a turn larger as compared to the rotation number of the other side gear due to a relation between the rotation of the pinion gear on its axis and the pair of the side gears (so-called mechanical paradox gears) different in the number of teeth.

In this case, the rotation drive source may have a drive torque achieving only the difference in the rotation number between the left and right side gears and therefore is made compact.

(5) On the premise of (3), the torque transmission device can have a configuration in which the torque transmission device comprises a vehicle speed sensor detecting a vehicle speed of the vehicle, and the control device is set to make the rotation number of the rotation drive source lower when the vehicle speed detected by the vehicle speed sensor becomes higher.

As a result, the differential function can be executed also in consideration of a status of the vehicle speed, and the differential function can be made lower when the vehicle speed is higher, so as to suppress a reduction in drive force due to an increase in slip ratio of tires. Additionally, in a situation (lift-in) where a wheel on the inside of the turn tends to lift up due to a centrifugal force during turning at high speed, a drive force can reliably be transmitted to a wheel on the outside of the turn.

(6) On the premise of (5), the torque transmission device can have a configuration in which the control device is set to inhibit the rotation of the rotation drive source within a predetermined steering angle range based on the neutral position of the steering angle and to expand the predetermined steering angle range in the increase direction of the steering angle when the vehicle speed detected by the vehicle speed sensor becomes higher.

As a result, turning control can be made stable during high-speed turning.

(7) The torque transmission device can have a configuration in which the wheel on the one side and the wheel on the other side of the vehicle are made up of front and rear wheels, and the torque transmission device comprises a running state detection device detecting a running state and a control device controlling the rotation drive source based on information from the running state detection device to control a difference in the rotation number between the front wheel and the rear wheel.

As a result, an adjustment can be made through the control of the rotation drive source by the control device so as to increase the running stability.

(8) The torque transmission device can have a configuration in which the pair of the side gears and the pinion gear are each made up of a spur gear.

As a result, when the present invention is implemented, generic products can be used for the gears, resulting in facilitation of manufacturing, simplification of structure, etc.

Effect of the Invention

From the above, the present invention can provide the torque transmission device capable of being compactified in the direction of parallel arrangement of the pair of the side gears while ensuring the differential function and the differential limiting function.

Since the need for the switching operation between engagement and disengagement between the gears is eliminated when the differential function and the differential limiting function are executed, the reliability of actuation can be increased unlike the clutch mechanism.

MODES FOR CARRYING OUT THE INVENTION

Embodiments of the present invention will now be described with reference to the drawings.

Figure 1:
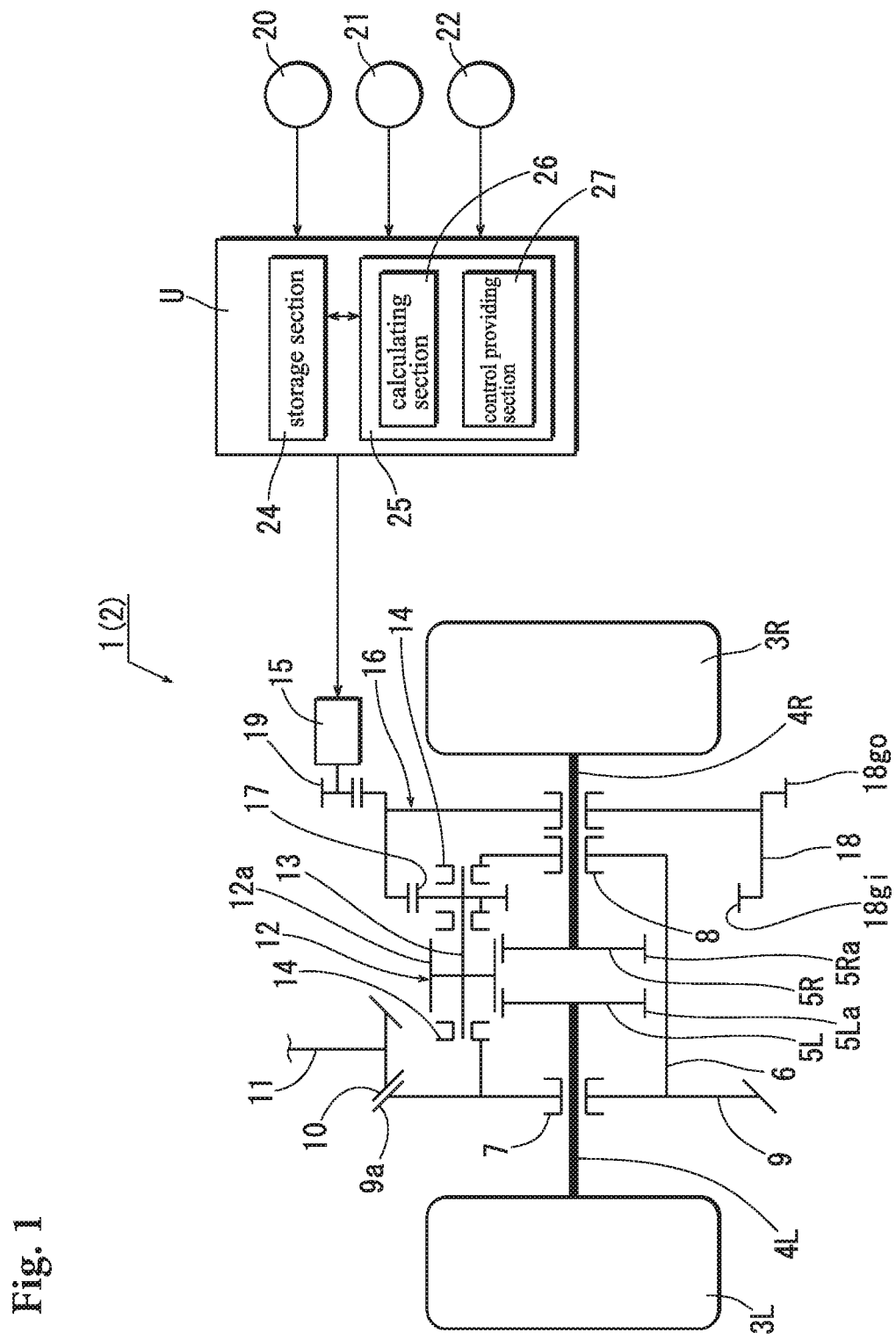
FIG. 1 is an explanatory view of a skeleton of a torque transmission device according to a first embodiment.

In FIG. 1 showing a first embodiment, reference numeral 1 denotes a torque transmission device according to an embodiment used as rear differential gears. In this embodiment, this torque transmission device 1 is interposed between a left axle 4L extending inward from a left rear wheel 3L in a vehicle width direction and a right axle 4R extending inward from a right rear wheel 3R in a vehicle width direction in a vehicle 2, and an output torque from the engine side is transmitted through the torque transmission device 1 to the left and right rear wheels 3L, 3R.

As shown in FIG. 1, the torque transmission device 1 includes a pair of side gears 5L, 5R as a torque output member. Each of the side gears 5L (5R) making a pair is made up of a spur gear that is a cylindrical gear having teeth 5La (5Ra) on an outer circumferential surface, and the both side gears 5L, 5R are only different in the number of the teeth 5La (5Ra) and are identical in terms of the other modules and diameter. In this embodiment, the one side gear 5L (5R) of the pair of the side gears 5L, 5R has the number of the teeth 5La (5R a) smaller by one than the number of the teeth 5Ra (5La) of the other side gear 5R (5L).

The pair of the side gears 5L, 5R is arranged such that both plate surfaces thereof come closer as much as possible without interference in the axial direction of the left and right axles 4L, 4R by taking advantage of being the spur gears having comparatively thin thickness (axial length), and the length in the direction of parallel arrangement (the left-right direction of FIG. 1) occupied by the pair of the side gears 5L, 5R is made shorter as much as possible. Out of these side gears, the left side gear 5L is relatively non-rotatably coupled to an inner end portion of the left axle 4L in the vehicle width direction and the right side gear 5R is relatively non-rotatably coupled to an inner end portion of the right axle 4R in the vehicle width direction. In this embodiment, spline coupling is used for the coupling of the left side gear 5L to the inner end portion of the left axle 4L in the vehicle width direction and the coupling of the right side gear 5R to the inner end portion of the right axle 4R in the vehicle width direction.

As shown in FIG. 1, the torque transmission device 1 includes a case 6 as a supporting member. The case 6 is formed into a shape extending as a hollow body or a frame body and the case 6 houses therein the left and right axles 4L, 4R in a straddling manner. Therefore, the case 6 houses therein the left and right axles 4L, 4R as well as the side gears 5L (5R) connected to the axles 4L (4R).

The case 6 is rotatably supported with respect to the left and right axles 4L, 4R. Therefore, one end side of the case 6 in the extending direction (left side of FIG. 1) and the left axle 4L are supported via a bearing 7, and the other end side of the case 6 in the extending direction (right side of FIG. 1) and the right axle 4R are supported via a bearing 8.

A ring gear 9 is disposed on an outer circumference of the case 6 on the one end side in the extending direction. This ring gear 9 is formed as a bevel gear, and teeth 9a of the ring gear 9 are engaged with a pinion gear 10 also formed as a bevel gear. This pinion gear 10 is fixed to an outer circumference of a propeller shaft 11 and the output torque from the engine side is transmitted through the propeller shaft 11, the pinion gear 10, and the ring gear 9 to the case 6. As a result, when the output torque from the engine side is input, the case 6 rotates around the axis of the pair of the side gears 5L, 5R (axis of the left and right axles 4L, 4R).

As shown in FIG. 1, the torque transmission device 1 includes a pinion gear 12. The pinion gear 12 is rotatably supported by the case 6 with the axial direction of the pinion gear 12 directed to the axial direction of the pair of the side gears 5L, 5R. Specifically, a support shaft 13 is rotatably supported by the case 6 via a bearing 14 with an axis thereof directed to the axial direction of the pair of the side gears 5L, 5R, and the pinion gear 12 is attached to an outer circumference of the support shaft 13. For this pinion gear 12, a spur gear is used that is a cylindrical gear having teeth 12a on an outer circumferential surface, and the pinion gear 12 is engaged with the pair of the side gears 5L, 5R in a straddling manner.

As shown in FIG. 1, the torque transmission device 1 includes a motor 15 as a rotation drive source. This motor 15 is connected through a power transmission mechanism 16 to the support shaft 13.

In this embodiment, the power transmission mechanism 16 includes a transmission gear (spur gear) 17 attached to the outer circumferential surface of the support shaft 13, a ring gear 18 rotatably supported by the right axle 4R, and an output gear 19 attached to an output shaft of the motor 15. The transmission gear 17 is located adjacently to the pinion gear 12 on the support shaft 13, so that the support shaft 13 and the pinion gear 12 are integrally rotated by rotation around the axis of the transmission gear 17. The ring gear 18 is formed into a bottomed cylindrical shape and has a bottom portion supported rotatably relatively to the right axle 4R with the opening side facing the side gear 5R (5L). The ring gear 18 has inner circumferential teeth 18gi formed on an inner circumferential surface thereof and outer circumferential teeth 18*go* formed on an outer circumferential surface thereof and the inner circumferential teeth 18*gi* of the ring gear 18 are engaged with the transmission gear 17. The output gear 19 is engaged with the outer circumferential teeth 18*go* of the ring gear 18 and the rotation of the output gear 19 causes the ring gear 18 to rotate relatively to the right axle 4R.

The motor 15 has a function of transmitting a rotational drive force through the rotation of the output shaft thereof via the output gear 19 to the ring gear 18. Therefore, when the motor 15 is driven, the ring gear 18 rotates relatively to the right axle 4R, so that the relative rotation of the ring gear 9 rotates the transmission gear 17 around the axis thereof and, consequently, the pinion gear 12 is rotated via the support shaft 13 around the axis thereof.

As shown in FIG. 1, the torque transmission device 1 includes a control unit U acting as a control device so as to control the motor 15. Therefore, the control unit U receives input of steering-angle information of the vehicle 2 from a steering-angle sensor 20, vehicle speed information (running state detection information) of the vehicle 2 from a vehicle speed sensor 21, and acceleration information (running state detection information) of the vehicle 2 from the acceleration sensor 2, and the control unit U outputs a control signal to the motor 15.

The control unit U includes a storage section 24 and a control section 25.

The storage section 24 is made up of a memory element such as a ROM (read only memory) and a RAM (random access memory) and stores a control program necessary for providing control and setting information such as a map used for obtaining the motor rotation direction and the rotation number of the motor, and the control program etc. are read by the control section 25 as needed.

The control section 25 in made up of a CPU (central processing unit) and the CPU operates in accordance with the control program stored in the storage section 24 as a calculating section 26 and a control providing section 27.

The calculating section 26 uses the map stored in the storage section 24 to determine whether the steering angle detected by the steering-angle sensor 20 is in a dead zone of the motor 15, based on the vehicle speed detected by the vehicle speed sensor 21, the acceleration detected by the acceleration sensor 22, and the steering angle detected by the steering-angle sensor 20, and obtains the rotation direction and the rotation number of the motor 15 if it is determined that the steering angle is in a region other than the dead zone of the motor 15.

Figure 2:
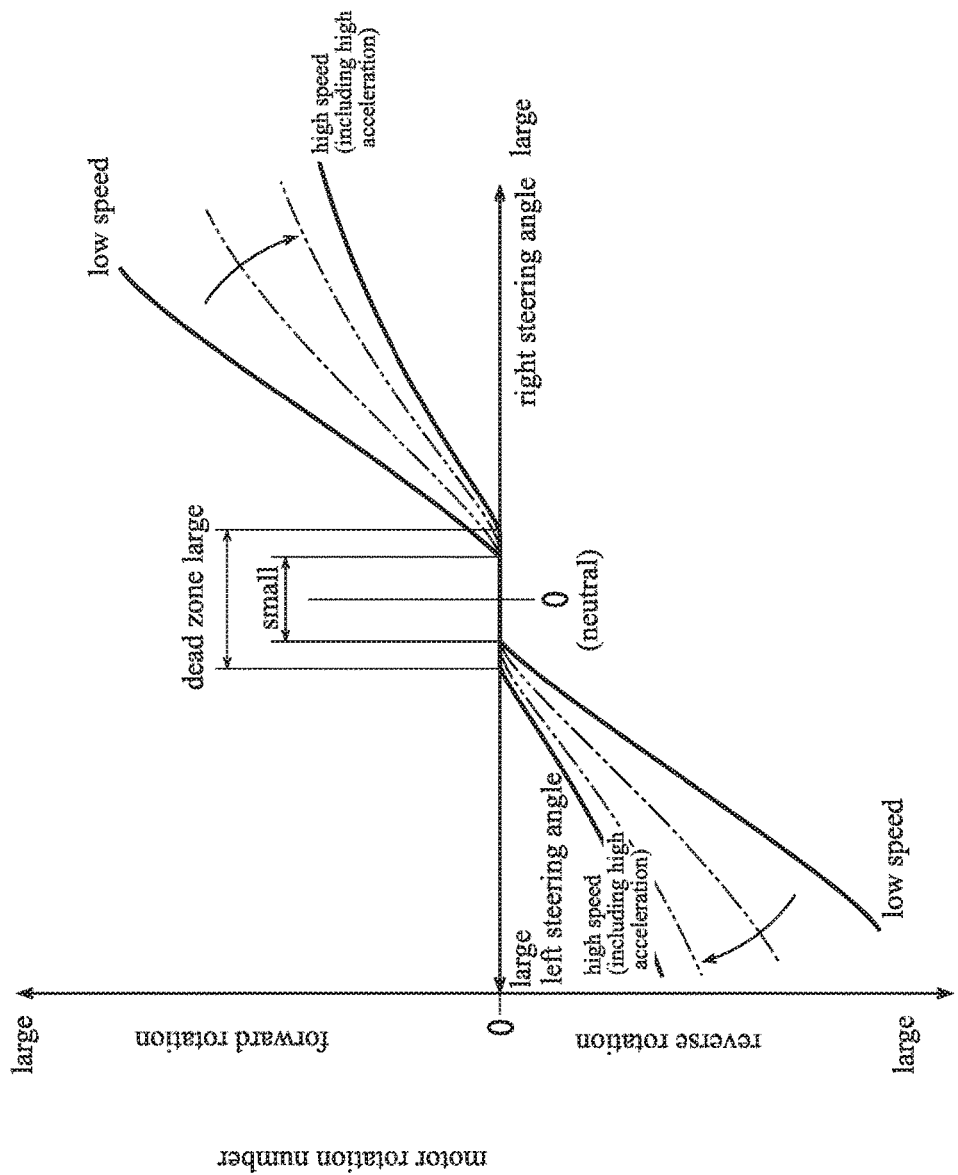
FIG. 2 is an explanatory view of an example of a map to which a control unit according to the first embodiment refers when calculating the rotation number of a motor.

Specific description will be made with reference to FIG. 2 showing contents of the map.

The map includes a predetermined steering angle range set as the dead zone of the motor 15 based on a neutral position (0°) of the steering angle and the dead zone becomes wider as the vehicle speed becomes higher. Therefore, the rotation of the motor 15 is inhibited (stopped) as long as the steering angle falls within the dead zone corresponding to the vehicle speed.

In the map, when the steering angle is larger than the dead zone (centering on the neutral position) on one side (the right side of FIG. 2) (in the case of the right turn), the motor 15 is rotated in the forward rotation direction and the motor rotation number thereof becomes larger when the steering angle is larger. Conversely, when the steering angle is larger than the dead zone on the other side (the left side of FIG. 2) (in the case of the left turn), the motor 15 is rotated in the reverse rotation direction and the motor rotation number thereof becomes larger when the steering angle is larger. As a result, during turning of the vehicle 2, the motor 15 is rotated in accordance with a state thereof in the rotation direction and at the rotation number corresponding to the state, and the pinion gear 12 accordingly rotates around the axis thereof, causing the pair of the side gears 5L, 5R different in the number of teeth to generate a difference in the rotation number absorbing a difference in the rotation number during the turning based on the rotation of the pinion gear 12 on its axis.

Moreover, in this case, the map is set such that when the vehicle speed detected by the vehicle speed sensor 21 is higher, the rotation number of the motor 15 is made lower. As a result, a higher vehicle speed makes the differential function lower so as to suppress a reduction in drive force due to an increase in slip ratio of tires and, even during turning at high speed, a drive force can reliably be transmitted via a wheel on the outside of the turn to the road surface in a situation (lift-in) where a wheel on the inside of the turn tends to lift up due to a centrifugal force.

In this embodiment, with regard to acceleration, as is the case with the vehicle speed, the rotation number of the motor 15 is made lower when the acceleration becomes larger.

The control providing section 27 has a function of outputting a control signal to the motor 15 based on the information from the calculating section 26.

As a result, during turning of the vehicle 2, based on the pair of the side gears 5L, 5R different in the number of teeth as well as the rotation direction and the rotation speed of the pinion gear 12 engaged with the pair of the side gears 5L, 5R, the pair of the side gears 5L, 5R has the rotation number of the side gear 5R (5L) on the outside of the turn made larger than the rotation number of the side gear 5L (5R) on the inside of the turn and this rotation state is transmitted through the axle 4L (4R) to the wheel 3L (3R).

The details of control of the control unit U will generally be described.

In this embodiment, when the vehicle 2 is in a running state (in a straight running state), the output torque from the engine is input via the propeller shaft 11, the pinion gear 10, and the ring gear 9 to the case 6 and the case 6 is rotated around the axis of the pair of the side gears 5L, 5R. As a result, the pinion gear 12 always rotates integrally with the case 6 (revolves around the axis of the pair of the side gears 5L, 5R) and the pinion gear 12 presses the both side gears 5L, 5R making the pair, thereby causing the pair of the side gears 5L, 5R to substantially integrally rotate (the direct-coupling state). Therefore, even when the vehicle is stuck in the mud or is in the lift-in state and the wheel 3L (3R) on one side is about to slip, the wheel 3R (3L) on the other side can be kept rotating and, based on the drive of the wheel 3R (3L) on the other side, the vehicle can escape from the mud or the drive force can reliably be transmitted to the road surface.

When the vehicle 2 turns, the motor 15 is driven in accordance with the turning and the pinion gear 12 is rotated on its axis in the rotating state (revolving state) associated with the rotation of the case 6. While the direction of the rotation of the pinion gear 12 on its axis is determined depending on a steering direction and the rotation number of the rotation is determined depending on a degree of the steering angle, the rotation of the pinion gear 12 on its axis and the numbers of teeth of the pair of the side gears 5L, 5R different from each are utilized to make the rotation number of the side gear on the outside of the turn larger than the rotation number of the side gear on the inside of the turn depending on a degree of the turn (a degree of the steering angle) and the rotation state of the side gear 5L (5R) is reflected on the wheel 3L (3R). As a result, even in the case of turning of the vehicle 2, the vehicle 2 can easily turn.

Figure 3:
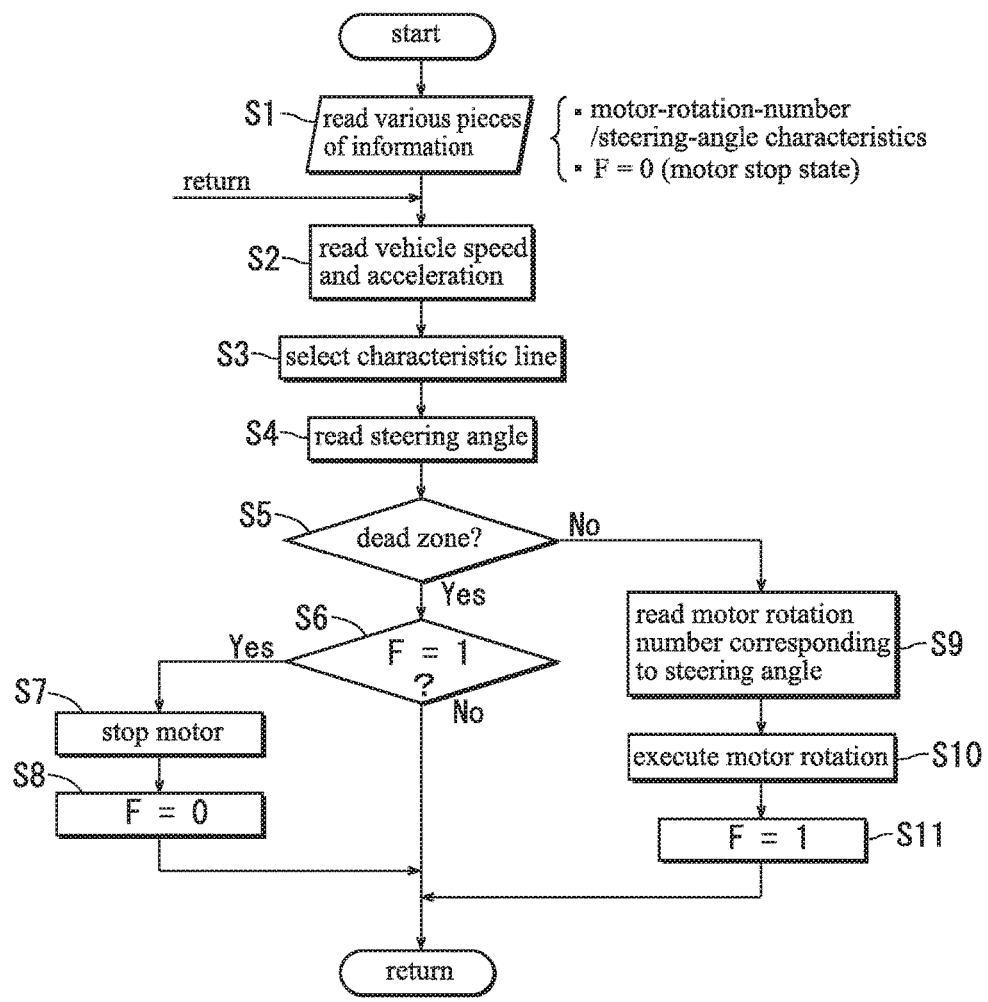
FIG. 3 is a flowchart of a control example of the control unit according to the first embodiment.

A control example of the control unit U will specifically be described based on a flowchart shown in FIG. 3. It is noted that S stands for step.

When the control is started, various pieces of information are read as initial information at S1, specifically including motor-rotation-number/steering-angle information (characteristic line), a flag F=0 (indicative of the stop state of the motor 15), etc. When the various pieces of information are read, the vehicle speed and acceleration of the vehicle 2 is read at S2 and, based on the information of S2, motor-rotation-number/steering-angle characteristics are selected depending on the vehicle speed (also in consideration of the acceleration) at S3 (see FIG. 2).

Subsequently, the steering angle is read at S4 and it is determine at S5 whether the steering angle of S4 falls within the dead zone. This is performed because of determining whether the rotation control of the pinion gear 12 corresponding to the steering angle must be provided.

If the determination of S5 is YES, it is determined at S6 whether the flag is F=1 (indicative of the rotating state of the motor 15). Because of F=0 at the start of the control, the determination of S6 is NO and the process is returned to S2 so as to newly start a process.

On the other hand, if S6 is YES, this is the case that the rotation control of the pinion gear 12 has been provided although the steering angle falls within the dead zone of the motor 15, and the motor 15 is stopped at S7 in this case. After S7, the flag F is reset (to F=0) at S8 and the process is returned to S2.

As a result, when S6 is NO and after the motor 15 is stopped at S7, the pinion gear 12 rotates integrally with case 6 (revolves around the axis of the pair of the side gears 5L, 5R) without rotating on its axis and the pinion gear 12 presses the both side gears 5L, 5R making the pair, thereby causing the pair of the side gears 5L, 5R to substantially integrally rotate (the direct-coupling state (the diff-lock function execution)). As a result, even when the wheel 3L (3R) on one side is stuck in the mud and put into a slipping state, the wheel 3R (3L) on the other side can be kept rotating and the vehicle can escape from the mud based on the drive of the wheel 3R (3L) on the other side.

If the determination of S5 is NO, the rotation number of the motor 15 corresponding to the steering angle of S4 is read at S9 based on FIG. 2, and the motor 15 is rotationally driven at the motor rotation number at S10. As a result, for example, when turning right, the rotation number of the one side gear 5L (the left rear wheel 3L) on the outside of the turn becomes larger due to the rotation of the pinion gear 12 on its axis than the rotation number of the other side gear 5R (the right rear wheel 3R) on the inside of the turn and becomes larger when the steering angle of the right turn is larger and, therefore, even when the vehicle 2 makes a right turn, the right turn is easily made. Similarly, when turning left, the rotation number of the other side gear 5R (the right rear wheel 3R) on the outside of the turn becomes larger due to the rotation of the pinion gear 12 on its axis than the rotation number of the one side gear 5L (the left rear wheel 3R) on the inside of the turn and becomes larger when the steering angle of the left turn is larger and, therefore, even when the vehicle 2 makes a left turn, the left turn is easily made (the differential function execution).

After the process of S10, the flag F is set to F=1 at S11 and the process is returned to S2.

Therefore, the torque transmission device 1 can selectively execute the differential function and the diff-lock function (differential limiting function) and when selectively executing the differential function and the diff-lock function, the execution can be determined depending on whether the pinion gear 12 is allowed to rotate (rotationally driven) on its axis in the state in which the pinion gear 12 formed as a spur gear is engaged in a straddling manner with the pair of the side gears 5L, 5R made up of spur gears different in the number of teeth. This eliminates the need for forming a clutch mechanism (a diff-lock mechanism) on the lateral side of the case 6 (the right or left lateral side in FIG. 1) so as to ensure the diff-lock function.

Additionally, since the spur gears are used rather than bevel gears for the pinion gear 12 and the pair of the side gears 5L, 5R, comparatively thin gears can respectively be used for the side gears 5L, 5R making the pair and can closely be arranged, and the pinion gear 12 can be engaged with the pair of the side gears 5L, 5R.

As a result, the torque transmission device 1 can be compactified in the direction of parallel arrangement of the pair of the side gears 5L, 5R (the left-right direction of FIG. 1) while ensuring the differential function and the diff-lock function.

Since the differential function and the diff-lock function are switched depending on whether the pinion gear 12 is allowed to rotate on its axis in the state in which the pinion gear 12 formed as a spur gear is engaged in a straddling manner with the pair of the side gears 5L, 5R made up of spur gears, this eliminates the need for the switching operation between engagement and disengagement of the gears. Therefore, unlike the case of using a clutch mechanism for performing a switch between the differential function and the diff-lock function, the actuation in the torque transmission device 1 can be made highly reliable.

Figure 4:
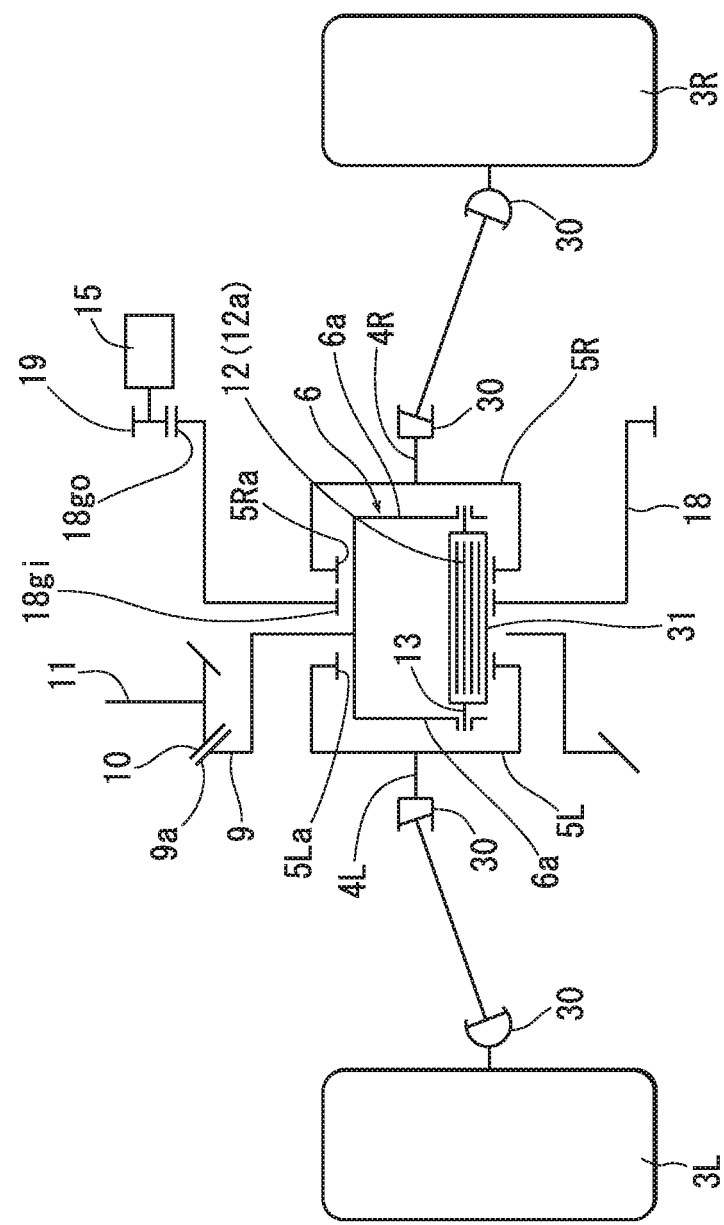
FIG. 4 is an explanatory view of a skeleton of a torque transmission device according to a second embodiment.

FIG. 4 shows a second embodiment. In this second embodiment, the same constituent elements as those of the first embodiment are denoted by the same reference numerals and will not be described.

The second embodiment shown in FIG. 4 represents the case that cylindrical gears having teeth disposed on inner circumferential surfaces are used as a pair of the side gears 5L, 5R.

Specifically, each of the cylindrical gears making up the side gears 5L, 5R forms a bottomed cylindrical shape having a comparatively short axial length as shown in FIG. 4 and the teeth 5La, 5Ra are respectively disposed on inner circumferential surfaces on the opening sides. The both side gears 5L, 5R are arranged with the opening sides facing and brought close to each other and the both bottom portion sides are arranged away from each other as compared to the opening sides. Radial center portions of the bottom portions are respectively coupled via the left and right axles 4L, 4R to the left and right rear wheels 3L, 3R, and the rotation of the side gears 5L, 5R is transmitted to the left and right rear wheels 3L, 3R. Reference numeral 30 denotes a coupling interposed in the axle 4L (4R).

The both side gears 5L, 5R are only different in the number of the teeth 5La, 5Ra (specifically, the one side gear 5L (5R) of the pair of the side gears 5L, 5R has the number of teeth smaller by one than the number of teeth of the other side gear 5R (5L)) and are identical in terms of the other modules and diameter.

As shown in FIG. 4, the case 6 acting as a supporting member is disposed in the pair of the side gears 5L, 5R in a straddling manner between the side gears 5L, 5R making a pair. The case 6 is formed as a hollow body in an extending shape and the case 6 is disposed with an axis thereof matched on the axis of the pair of the side gears 5L, 5R. An opening 31 is formed in an outer circumferential surface of the case 6 and the inside of the case 6 is opened to the outside through the opening 31.

A ring gear 9 is attached to an outer circumference of the case 6 on the inner side in the extending direction. The ring gear 9 has a radial inner side portion coupled through between the side gears 5L, 5R making the pair to the outer circumferential surface of the case 6 and has a radial outer side portion extending to the radial outer side of the pair of the side gears 5L, 5R, and the pinion gear 10 connected to the propeller shaft 11 is engaged with a tooth portion (bevel gear) 9a in the radial outer side portion, as is the case with the first embodiment.

As shown in FIG. 4, the pinion gear 12 is housed in the case 6. For this pinion gear 12, a cylindrical gear (spur gear) with the teeth 12a disposed on the outer circumferential surface is used and the pinion gear 12 is rotatably supported via the support shaft 13 by left and right side walls 6a of the case 6 with the axial direction of the pinion gear 12 directed to the axial direction of the pair of the side gears 5L, 5R. The pinion gear 12 is located on the radial outer side relative to the radial center portion of the case 6 with a portion (the teeth 12a) of the outer circumferential surface of the pinion gear 12 exposed outside through the opening 31 of the case 6, and the exposed portion (the teeth 12a) of the pinion gear 12 is engaged with the pair of the side gears 5L, 5R in a straddling manner.

As shown in FIG. 4, the rotational drive force of the motor 15 is transmitted via the ring gear 18 to the pinion gear 12. The ring gear 18 is disposed with the inner circumferential teeth 18gi and the outer circumferential teeth 18go, and the inner circumferential teeth 18gi of the ring gear 18 are brought into the opening of the case 6 through between the side gears 5L, 5R making the pair and are engaged with the pinion gear 12. In this case, the inner circumferential teeth 18gi are obviously set as a gear having the same specifications as the pair of the side gears 5L, 5R. The outer circumferential teeth 18go of the ring gear 18 are positioned radially outside the pair of the side gears 5L, 5R and the output gear 19 of the motor 15 is engaged with the outer circumferential teeth 18go.

As a result, when selectively executing the differential function and the diff-lock function in this torque transmission device 1, the execution can be determined depending on whether the pinion gear 12 is allowed to rotate (rotationally driven) on its axis in the state in which the pinion gear 12 formed as a spur gear is engaged in a straddling manner with the pair of the side gears 5L, 5R formed as spur gears different in the number of teeth and it is therefore no longer necessary to form a clutch mechanism (a diff-lock mechanism) on the lateral side of the case 6 (on the right or left lateral side in FIG. 1) so as to ensure the diff-lock function. Thus, this torque transmission device 1 can be compactified in the direction of parallel arrangement of the pair of the side gears 5L, 5R (the left-right direction of FIG. 1) while ensuring the differential function and the diff-lock function. Additionally, when the differential function and the diff-lock function are switched, the switching operation between engagement and disengagement of the gears can be eliminated to make the actuation in the torque transmission device 1 highly reliable.

Although the embodiments have been described, the present invention encompasses the following forms.

(1) The torque transmission device 1 is used not only as rear differential gears but also as front differential gears and center differential gears (interposed between the front wheel side and the rear wheel side).

(2) If the torque transmission device 1 is used as the center differential gears, the motor 15 is controlled to make an adjustment to absorb a difference in the rotation number between a front wheel and a rear wheel during turning or to make an adjustment to increase the torque to the rear wheel in such a case that the front wheel slips.

(3) Instead of spur gears used for the pair of the side gears 5L, 5R and the pinion gear 12, helical gears etc. also classified into the cylindrical gears are used for the pair of the side gears 5L, 5R and the pinion gear 12.

EXPLANATIONS OF LETTERS OR NUMERALS 1 torque transmission device
3L left rear wheel
3R right rear wheel
5L left side gear
5La left side gear teeth
5R right side gear
5Ra right side gear teeth
6 case (supporting member)
12 pinion gear
12a pinion gear teeth
15 motor (rotation drive source)
20 steering-angle sensor
21 vehicle speed sensor
22 acceleration sensor
U control unit (control device)

The invention claimed is:

1. A torque transmission device comprising: a pair of side gears arranged facing each other on the same axis and respectively coupled as a torque output member to a wheel on one side and a wheel on the other side of a vehicle; a supporting member rotating around the axis of the pair of the side gears as a torque input member inputting torque from an engine; and a pinion gear rotatably supported by the supporting member and engaged with the pair of the side gears in a straddling manner, the pair of the side gears being configured as cylindrical gears having teeth disposed on either an outer circumferential surface or an inner circumferential surface, the side gears having the numbers of teeth different from each other, the pinion gear being a cylindrical gear having teeth disposed on an outer circumferential surface, the teeth engaging with the pair of the side gears, the pinion gear being attached integrally to a support shaft, the support shaft of the pinion gear being attached to the supporting member via a bearing, the pinion gear being disposed with an axial direction of the pinion gear and its support shaft directed in the same direction as the axial direction of the pair of the side gears, the support shaft of the pinion gear being associated with a motor applying rotation around the axis of the support shaft corresponding to a running state of the vehicle.

2. The torque transmission device according to claim 1, wherein the pair of the side gears is formed as cylindrical gears having teeth disposed on the outer circumferential surfaces, wherein the supporting member is disposed on the outer circumferential side of the pair of the side gears, and wherein the pinion gear is engaged with the pair of the side gears on the radial outer side of the pair of the side gears.

3. The torque transmission device according to claim 1, wherein the pair of the side gears is formed as cylindrical gears having teeth disposed on the inner circumferential surfaces, wherein the supporting member is disposed on the inner circumferential side of the pair of the side gears, and wherein the pinion gear is engaged with the pair of the side gears on the radial inner side of the pair of the side gears.

4. The torque transmission device according to claim 1, wherein the wheel on one side and the wheel on the other side of the vehicle are made up of left and right wheels, and wherein the torque transmission device comprises a steering-angle sensor detecting a steering angle and a control device controlling the motor during turning based on steering-angle information detected by the steering-angle sensor such that the rotation number of one of the side gears coupled to the wheel on the outside of the turn is made larger as compared to the rotation number of the other side gear and made larger as the steering angle detected by the steering-angle sensor becomes larger from a neutral position.

5. The torque transmission device according to claim 4, wherein when making the rotation number of one of the side gears coupled to the wheel on the outside of the turn larger as compared to the rotation number of the other side gear, the control device controls the motor to rotate in either direction of forward rotation and reverse rotation.

6. The torque transmission device according to claim 4, wherein the torque transmission device comprises a vehicle speed sensor detecting a vehicle speed of the vehicle, and wherein the control device is set to make the rotation number of the motor lower when the vehicle speed detected by the vehicle speed sensor becomes higher.

7. The torque transmission device according to claim 6, wherein the control device is set to inhibit the rotation of the motor within a predetermined steering angle range based on the neutral position of the steering angle and to expand the predetermined steering angle range in the increase direction of the steering angle when the vehicle speed detected by the vehicle speed sensor becomes higher.

8. The torque transmission device according to claim 1, wherein the pair of the side gears and the pinion gear are each made up of a spur gear.

* * * * *